Figure 1:
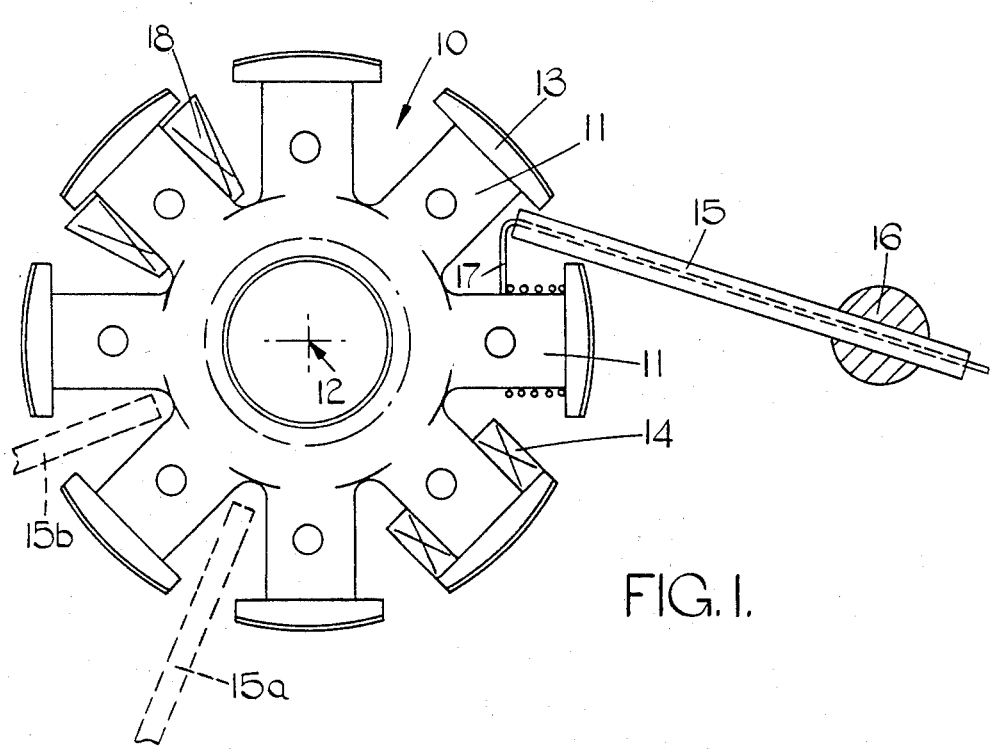

United States Patent [19]

Pierce et al.

[11] 4,358,063

[45] Nov. 9, 1982

[54] METHOD AND APPARATUS FOR WINDING CONDUCTOR COILS ON RADIALLY EXTENDING PARTS OF A WORKPIECE

[75] Inventors: Charles F. E. Pierce; George R. Waldock, both of Hempstead; Noel J. Woolford, Leighton Buzzard, all of England

[73] Assignee: Lucas Industries Limited, Birmingham, England

[21] Appl. No.: 155,581

[22] Filed: Jun. 2, 1980

[30] Foreign Application Priority Data

Jun. 26, 1979 [GB] United Kingdom ................. 7922241

[51] Int. Cl.³ ............................................. H02K 15/09
[52] U.S. Cl. ................................. 242/7.03; 140/92.1; 242/1.1 R; 242/7.05 C; 242/7.16
[58] Field of Search ............. 242/1.1 R, 7.05 C, 7.09, 242/7.14, 7.16; 140/92.1, 92.2

[56] References Cited

U.S. PATENT DOCUMENTS

| 2,381,750 | 8/1945 | Hunsdorf | 242/7.05 C |
| 2,928,617 | 3/1960 | Lill | 242/1.1 R |
| 3,106,351 | 10/1963 | Fulton | 242/7.09 X |
| 3,279,708 | 10/1966 | Rondas | 242/7.09 |
| 3,822,830 | 7/1974 | Peters | 242/1.1 R |

Primary Examiner—Billy S. Taylor
Attorney, Agent, or Firm—Trexler, Bushnell & Wolters, Ltd.

[57] ABSTRACT

An apparatus for winding a conductor coil about a radially extending part of a workpiece includes means for moving the workpiece axially and angularly relative to a guide so that a wire issuing from said guide is wound about the part. The guide is also moved radially of the part so that the wire may be wound helically on the part. The means for effecting radial movement of the guide includes means for adjusting its position relative to the axis of angular movement of the workpiece, so that the wire is laid on to the part in a straight line during said angular movement.

4 Claims, 7 Drawing Figures

METHOD AND APPARATUS FOR WINDING CONDUCTOR COILS ON RADIALLY EXTENDING PARTS OF A WORKPIECE

This invention relates to a method and apparatus for winding conductor coils on to a radially extending part of a workpiece.

It is known to wind coils of conductor wire on to a former which is part of a workpiece having a plurality of such formers which extend radially of a polar axis of the workpiece. It is known to effect this winding by feeding the conductor wire through a guide and causing oscillating movement of said guide about an axis which is in spaced parallel relationship to the polar axis of the workpiece, and also causing relative linear movement between the guide and the workpiece in directions parallel to said workpiece axis. Where the coil is to be wound about a part which extends radially outwardly of the workpiece axis it is in many cases difficult or impossible to apply the conductor wire close to the radially inner end of the part on which the coil is being wound.

It is an object of the present invention to provide a method and apparatus in which the foregoing difficulty is overcome.

It is an additional difficulty of the foregoing method that oscillating movement between the workpiece and the guide can cause adjacent conductor turns in a layer to overlap, and this has been found to result in loose windings and poor utilisation of the space available for the coil.

It is a further object of the present invention to minimise a tendency of adjacent turns to overlap.

According to the invention a method for winding a conductor coil on to a part of a workpiece having a plurality of such parts extending radially of a polar axis of the workpiece includes the steps of feeding said conductor through a guide, causing a first linear reciprocating relative motion between said guide and said workpiece in directions substantially parallel to said polar axis of the workpiece, causing oscillating angular relative motion between said guide and said workpiece about said polar axis thereof, the movements constituting said first linear motion alternating with the movements constituting said angular motion and causing a second linear relative motion between said guide and said workpiece radially of said polar axis thereof.

In a preferred embodiment said method includes modifying the position causing successive radially inward and radially outward movements of said guide during each of said angular movements, the amounts of said successive radial movements being dependent on the radial positions of said guide, relative to the workpiece polar axis, at the beginning of the respective angular movements, and being such as to result in substantially straight-line relative movements between said guide and said workpiece during said angular movements.

According to another aspect of the invention, an apparatus for winding a conductor coil on to a part of a workpiece having a plurality of such parts extending radially of a polar axis of the workpiece, comprises means for guiding a conductor wire, means for causing a first linear reciprocating relative motion between said guide means and said workpiece in directions parallel to said polar axis of the workpiece and for causing oscillating angular relative motion between said guide means and said workpiece about said polar axis thereof, the movements constituting said first linear motion alternating with the movements constituting said angular motion, and means for causing a second linear relative motion between said guide means and said workpiece radially of said polar axis thereof.

Preferably, said apparatus includes means for modifying the radial position of said guide means relative to said workpiece polar axis during each of the angular movements which constitute said angular motion, said modifying means including means for providing successive radially inward and radially outward movements during each said angular movement.

Figure 2:
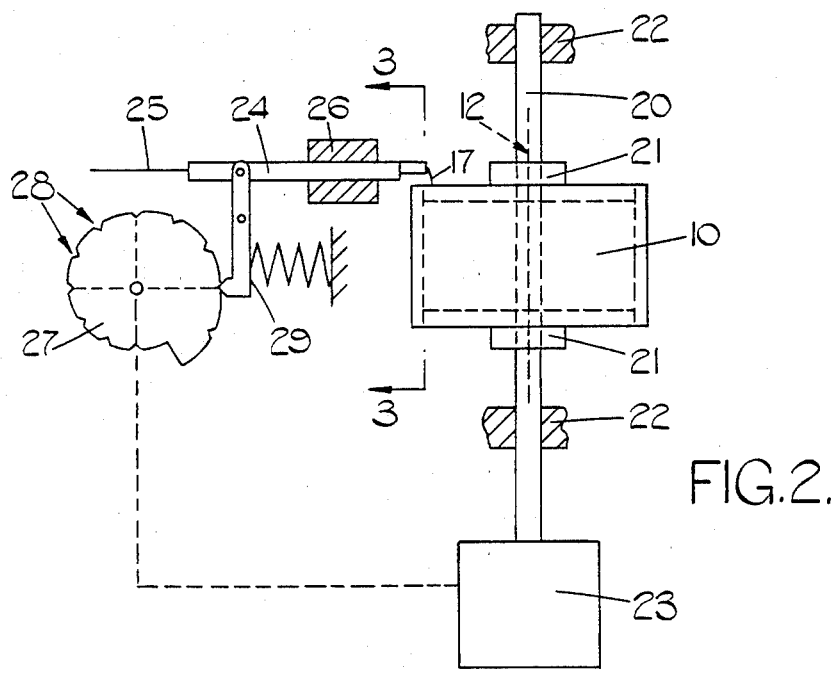
Figure 3:
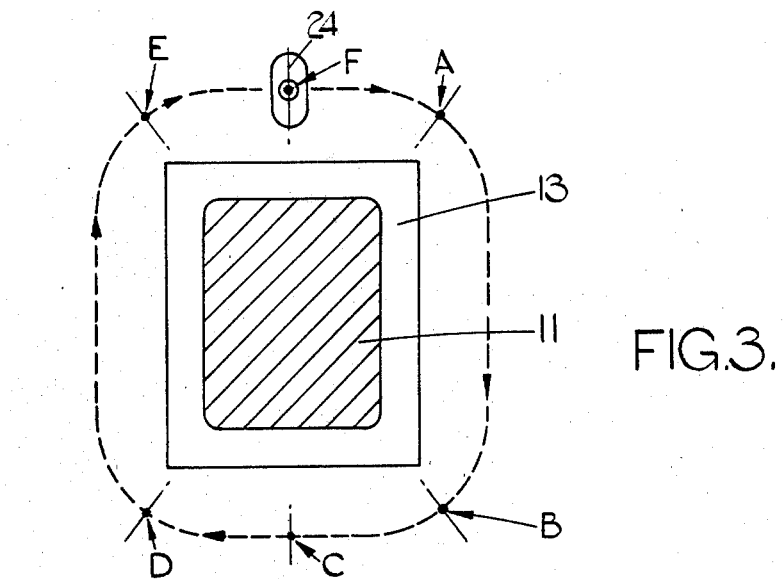
Figure 4:
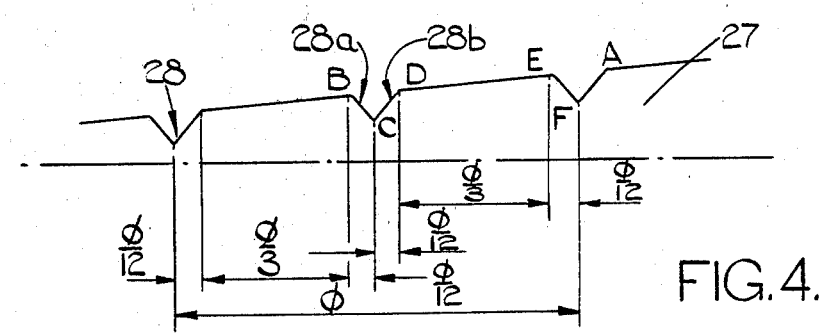
Figure 5:
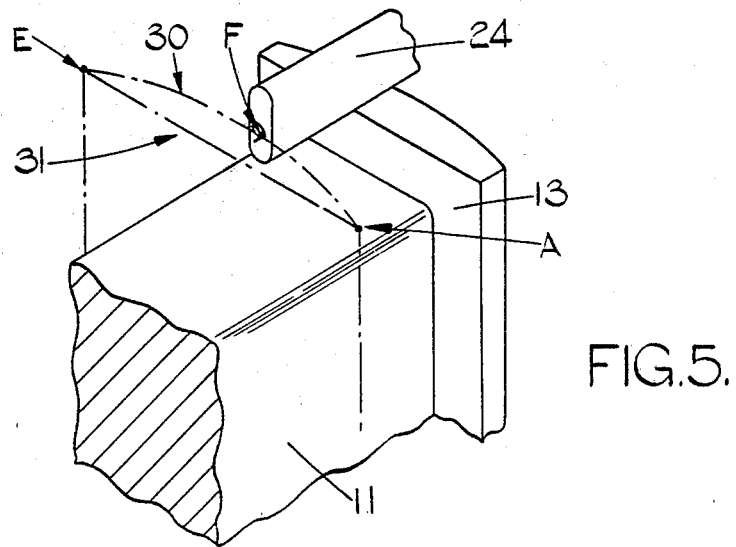
Figure 6:
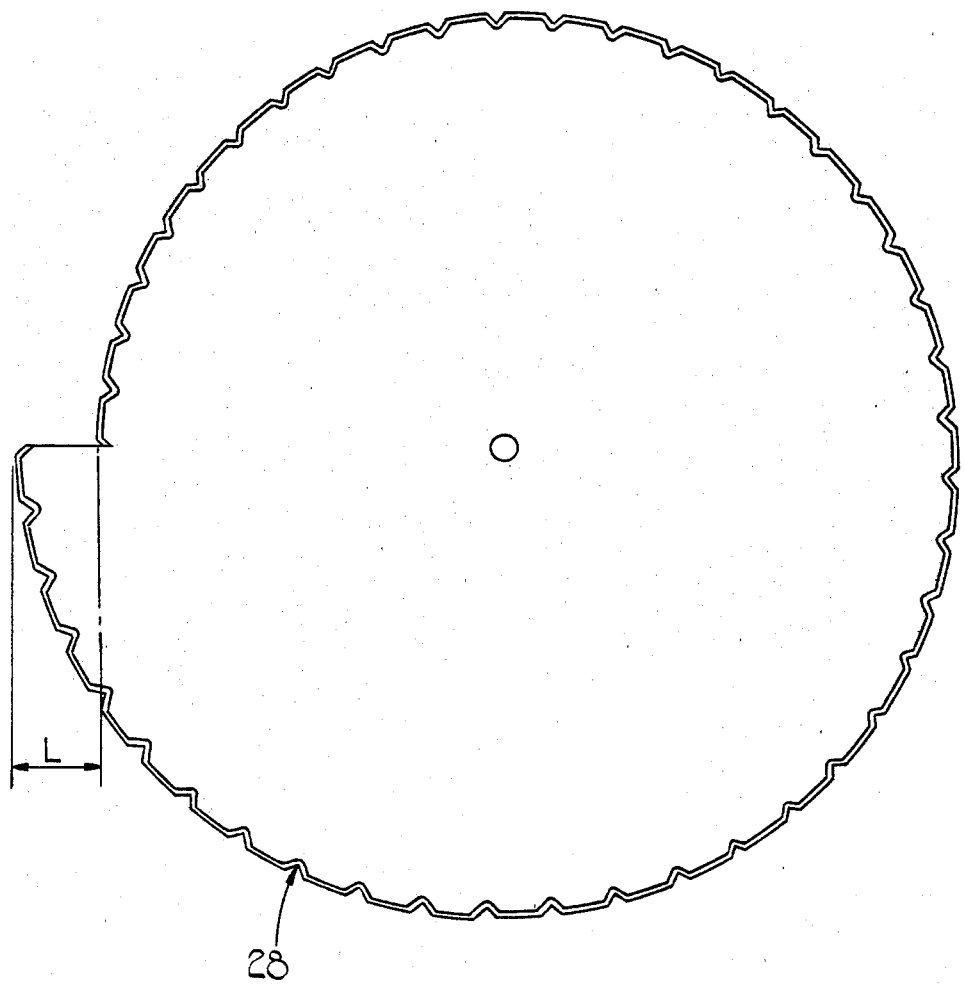
Figure 7:
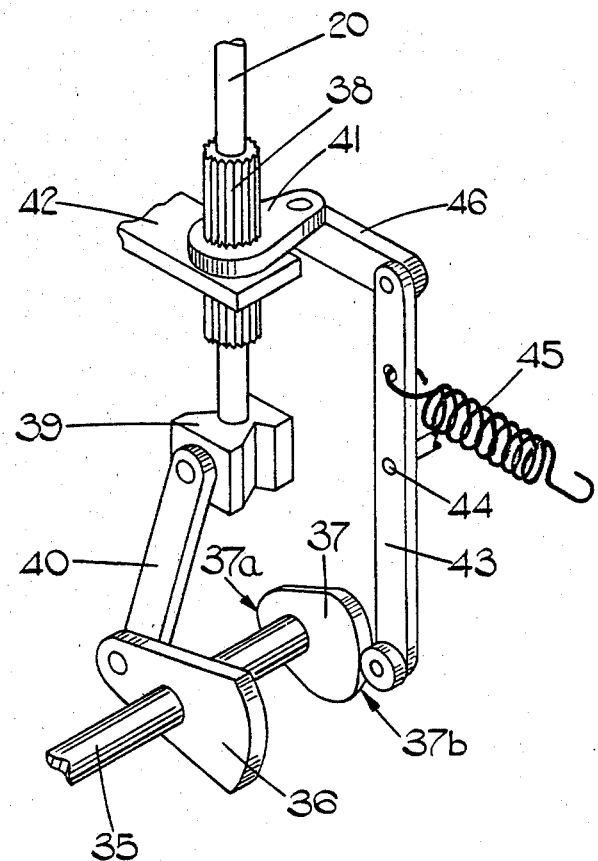

An embodiment of the invention will now be described by way of example only and with reference to the accompanying drawings in which:

FIG. 1 shows, diagrammatically, a workpiece and a known means of applying a coil to a radially extending part thereof, FIG. 2 shows, diagrammatically, an apparatus according to the present invention, FIG. 3 is a view, to an enlarged scale, on line 3—3 of FIG. 2, and indicating relative movement, in one plane, between the workpiece and a guide, FIG. 4 is a diagram showing the relationship between relative operating positions indicated in FIG. 3, and parts of a radial position modifying device shown in FIG. 2, FIG. 5 is a diagram showing the effect of the position-modifying device, FIG. 6 shows a cam for controlling application of a winding having 22 turns in each layer and FIG. 7 is a diagram of a drive mechanism forming part of the apparatus of FIG. 2.

The workpiece 10 shown in FIG. 1 is the core of a rotor of a rotary electrical machine, and has eight equi-angularly spaced parts 11 which extend radially outwardly of the polar axis 12 of the workpiece 10. Each of the parts has a radially outer flange 13 and is required to be provided with a conductive winding, as indicated at 14.

According to a known method and apparatus, a hollow guide needle is mounted for angular movement about the axis of a pillar 16, the axis of the pillar 16 being parallel to the polar axis 12. The needle 15 is also arranged to be reciprocated linearly of the axis of the pillar 16, so that successive angular and linear reciprocating movements cause a conductor 17 to be wound about a part 11, and thereby to form a required winding 14. It will be apparent from FIG. 1 that in many cases the parts 11 adjacent to the part about which a coil is being wound, and also the effect of the flanges 13, prevents the conductor 17 from being applied close to the radially inner ends of the parts 11. This results in poor utilisation of the space which would otherwise be available for the winding 14.

The present invention provides that relative pivotal movement between the guide and the workpiece is constrained to be about the polar axis of the workpiece. The effect of this is indicated in FIG. 1 at 15a and 15b, from which it will be seen that the guide can be advanced radially inwardly of the workpiece 10 to a much greater extent than was possible with the known arrangement. As shown diagrammatically in FIG. 2 the workpiece 10 is secured to a shaft 20 by clamping devices 21. The shaft 20 is supported in bearings 22. A drive mechanism 23 of a known type is operable to impart both linear and angular reciprocating motions to the shaft 20. A hollow guide 24 for conductor wire 25 is mounted in a relatively fixed bearing 26 for sliding movement radially of the axis 12. The mechanism 23 also drives a cam 27 so that the latter is rotated alternately in opposite directions for just under one revolution. The operating edge of the cam 27 is formed with a series of indentations 28 whose purpose will be explained hereafter. A lever 29 is biased into contact with the cam surface and engages the guide 24 so that the radial position of the latter with respect to the axis of the shaft 20 is dependent on the position of the cam 27.

FIG. 3 shows the path of relative movement between the workpiece 10 and the guide 24 as a result of successive alternate angular and linear movements of the workpiece 10 by the mechanism 23. Movement from A to B is effected largely by an upward movement of the workpiece 10; from B to D largely by an angular movement of the workpiece 10 in one direction; from D to E largely by a downward movement of the workpiece 10; and from E to A largely by an angular movement of the workpiece 10 in the opposite direction. Each cycle $\phi$ of the drive mechanism 23 thus provides a series of relative movements between the guide 24 and workpiece 10 which will cause one turn of the conductor 25 to be applied to the workpiece. At the same time a single cycle of the drive mechanism 23 causes the cam 27 to be rotated so that the lever 29 successively engages the next two indentations 28. The general form of the cam 27 results in radial movement of the guide 24 and thus causes a coil to be wound generally helically about the appropriate part of the workpiece 10.

FIG. 4 shows a developed view of part of the surface of the cam 27. As previously indicated one cycle $\phi$ of the drive mehanism 23 causes the cam 27 to be rotated by an amount equal to two of the spaces between the indentations 28. Each of the indentations 28 has two portions 28a and 28b each of which corresponds to a twelfth of a cycle $\phi$ of the drive mechanism 23, and engagement of the lever 29 (FIG. 2) with the indentations 28 causes the guide 24 first to be moved radially inwardly, and then radially outwardly of the polar axis 12 of the workpiece 10.

As shown in FIG. 5 a relative angular movement between the workpiece 10 and guide 24 during the one sixth of a cycle $\phi$ between E and A would cause the exit point of the guide 24 to describe an arc 30 relative to the workpiece axis. This can cause conductor wire deposited during the movement from E to A to overlie a previously applied turn of the wire. This is particularly true when the direction of rotation of the cam 27 is such that movement of the guide 24 is generally radially inwardly of the workpiece 10. The indentations 28 are such that during a relative angular movement between E and F the guide 24 is moved radially inwardly of the workpiece axis, and between F and A is moved radially outwardly. The resultant relative movement is substantially a straight line, indicated at 31 in FIG. 5 which is perpendicular both to the polar axis 12 and a radius of the workpiece. It will be understood that movement between points B and D (FIG. 3) are similarly modified to ensure a substantially straight line motion.

FIG. 6 is a view of a cam intended for controlling application of windings having 22 turns in each layer. It will be apparent that the dimension L represents the total radial length of the winding, and that the ratio of the cam circumference to the dimension L is dependent on the diameter of wire being wound.

Since, in the present example, the relative angular movements between the workpiece 10 and the guide 24 have a constant magnitude, the lengths of the arc 30 and the chord 31 (FIG. 5) both increase with increasing radial distance from the polar axis 12 of workpiece 10. The effect is that the distance between the chord 31 and point F on the arc 30 increases with increasing radial distance. The correction required to be applied by the indentations 28 in the cam 27 thus increases, and it will be seen from FIG. 6 that the identations 28 deepen as the cam radius increases, increasing cam radius corresponding to increased radial distance of the guide 24 from the workpiece polar axis 12.

It is to be noted that in an alternative embodiment the drive mechanism 23 may be arranged to decrease the angle of rotation of the workpiece 10 with increase in the radial distance of the guide 24 from the polar axis 12. In such an arrangement it can be arranged that the correction required to be applied by the indentations 28 remains substantially constant, and the indentations may therefore be identical around the cam surface.

In order to effect maximum use of available space for the windings, these may be applied to the parts 11 in a generally pyramidal form, as indicated at 18 in FIG. 1. For this purpose it is arranged that angular movement of the cam 27 decreases as successive layers of the windings 18 are applied.

It will be understood that angular movement of the cam 27 may be modified in alternative ways so as to build up successive winding layers in a desired configuration.

The mechanism 23 for imparting linear and angular reciprocating motion to the shaft 20 is shown diagrammatically in FIG. 7. An input drive shaft 35 has secured thereto a crank 36 and a cam 37. The shaft 20 includes an externally splined portion 38 and is mounted for free rotation in a bottom bearing block 39 which is itself vertically slidable in guides (not shown) which are secured to a fixed part of the mechanism. A connecting link 40 is pivotally connected to the crank 36 and the block 39 so that rotation of the shaft 35 causes reciprocating motion of the shaft 20. An internally splined crank arm 41 engages the splined portion 38 of the shaft 20 and is supported on a fixed bracket 42. A cam follower 43 is mounted for movement about a pivot 44 and is biassed to engagement with the cam 37 by a spring 45. The end of the follower 43 remote from the cam 37 is pivotally connected to the arm 41 by a link 46. The cam 37 has two dwell portions 37a, 37b having different distances from the axis of the shaft 35, so that no rotation is imparted to the shaft 20 when the follower 43 engages these dwell portions, which respectively correspond to the movements of the work piece from B to D and from E to A as indicated in FIG. 3.

We claim:

1. An apparatus for winding a conductor coil on to a part of a workpiece having a plurality of such parts extending radially of a polar axis of the workpiece, comprising means for guiding a conductor wire, means for causing a first linear reciprocating relative motion between said guide means and said workpiece in directions parallel to said polar axis of the workpiece and for causing oscillating angular relative motion between said guide means and said workpiece about said polar axis thereof, the movements constituting said first linear motion alternating with the movements constituting said angular motion, means for causing a second linear relative motion between said guide means and said workpiece radially of said polar axis thereof, and means for modifying the radial position of said guide means relative to said workpiece polar axis during each of the angular movements which constitute said angular motion, said modifying means including means for providing successive radially inward and radially outward movements during each said angular movement.

2. A method of winding a conductor coil on to part of a workpiece having a plurality of such parts extending radially of a polar axis of the workpiece, including the steps of feeding said conductor through a guide, causing a first linear reciprocating relative motion between said guide and said workpiece in directions substantially parallel to said polar axis of the workpiece, causing oscillating angular relative motion between said guide and said workpiece about said polar axis thereof, the movements constituting said first linear motion being alternated with the movements constituting said angular motion, imparting second linear relative motion between said guide and said workpiece radially of said polar axis thereof simultaneously with said first linear motion and said angular motion, superimposing successive radially inward and radially outward movements on said second linear motion during each of said angular movements, and controlling the amounts of said successive radial movements in dependence on the radial positions of said guide, relative to the workpiece polar axis, at the beginning of the respective angular movements, so as to result in substantially straight-line relative movements between said guide and said workpiece during said angular movements.

3. An apparatus as claimed in claim 1 in which said means for causing said second linear motion comprises a cam device coacting with said guide means and operably connected to said means for causing said angular and linear reciprocating motions.

4. An apparatus as claimed in claim 3 in which said means for modifying said radial position comprises zones on an operating face of said cam device, said zones coacting with said guide means.

* * * * *